Figure 1:
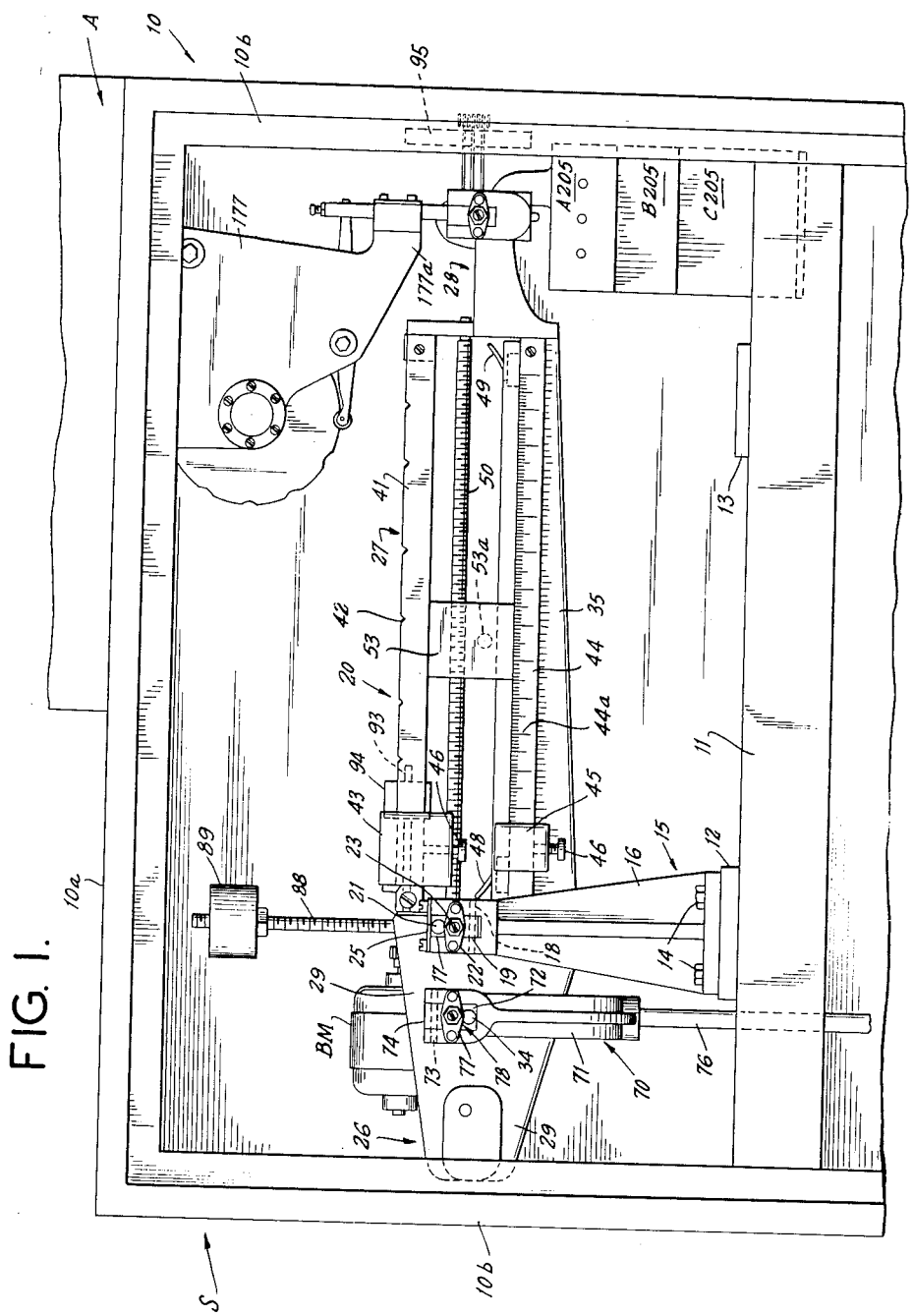

United States Patent Office 2,728,885
Patented Dec. 27, 1955

2,728,885
MOTOR CONTROL CIRCUITS FOR AUTOMATIC WEIGHING SCALES

Benjamin Cooper, New York, and Edward V. Cordes, Jr., Rego Park, N. Y.; said Cordes assignor to said Cooper Application January 11, 1950, Serial No. 137,972

4 Claims. (Cl. 318—283)

This invention relates to improvements in automatic weighing scales. An object is to provide an improved control circuit for such a weighing scale. In U. S. Patent No. 2,392,023 issued January 1, 1946, to Benjamin Cooper there is described an automatic weighing scale of the type controlled by the present invention.

It is usual in automatic weighing scales to use two sets of switch contacts operated by the scale balance beam; one set being actuated by an underbalance position of the scale beam and controlling circuits to add weight to bring the scale to balance, and the other set being actuated by an overbalance position of the scale beam and controlling circuits to subtract weight to bring the scale to balance. Since there is actually but one correct balance position for the scale beam, it is evident that in such a system the accuracy of balance is determined to a great degree by the sensitivity of these control switches to a slight unbalance position of the scale beam. In order to achieve this sensitivity of balance, it is necessary that the individual switch contacts be closely adjusted so that there is a minimum of lost motion in their actuation.

In the past, because the balance switches were used to control electric relays (which in turn operated motors to add or subtract weight to the balance beam to bring the scale to balance), the closeness of contact spacing was determined by the comparatively large relay operating current through the balance control switch contacts. Thus the spacing between the contacts had to be correspondingly great to avoid sparking and the resulting faulty operation or inoperation of the control circuits. Moreover, since some sparking was unavoidable, it was frequently necessary to clean and adjust these control switch contacts.

It is accordingly one object of this invention to provide an automatic weighing scale control circuit that will operate properly with very close setting of the balance control switch contacts so that greater weighing accuracy is possible.

It is another object of this invention to provide an automatic weighing scale balance control circuit that substantially eliminates balance control switch contact sparking.

It is another object of this invention to provide an automatic weighing scale balance control circuit that is practically instantaneously responsive.

It is a further object of this invention to provide a simple, efficient, trouble-free automatic weighing scale balance control circuit.

Other objects of this invention will in part be obvious and in part hereinafter pointed out.

The invention, accordingly, consists in the features of construction, combinations of elements and arrangement of parts which is exemplified in the construction hereinafter described and of which the scope of application is indicated in the appended claims.

Figure 2:
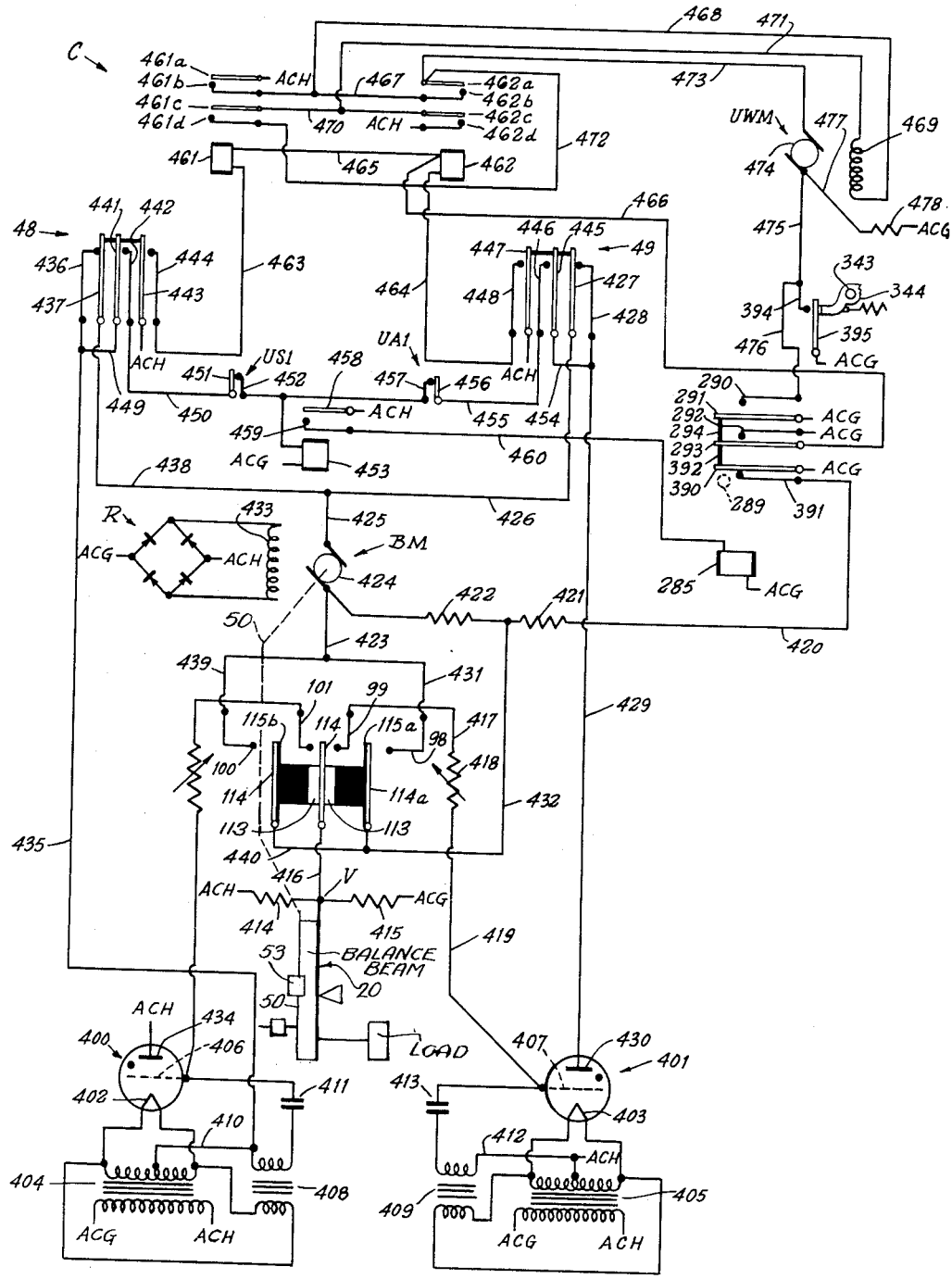

In the accompanying drawings, in which one of the various possible illustrative embodiments of this invention is shown, Fig. 1 is a front elevation of an automatic beam scale;

Fig. 2 is a schematic circuit diagram of the control circuit embodying this invention.

Referring now in detail to the drawings, S designates a scale embodying the invention. The same comprises a scale cabinet 10, the front, back and a side panel being removed from the cabinet frame, to disclose the interior (Fig. 1).

Interconnecting the front vertical frame members 10b of cabinet 10, is a horizontal angle shaped member 11. Interconnecting the rear vertical frame members 10b of the cabinet, is another horizontal member 11 aligned with the first member 11. Fixed to both members 11, and spaced apart to form two platforms, are two, flat, horizontal plates 12 and 13, parallel to the sides of the cabinet. Fastened to plate 12, as by bolts 14, is a yoke shaped member 15, terminating in two vertical upstanding arms 16. Each of the arms 16 is bifurcated at its end forming aligned slots 17. Fixed within slots 17, as by pins 18, are bearings 19.

Supported in the bearings 19 is a scale beam 20, having two horizontally aligned, depending knife blades 21 resting in said bearings. Knife blades 21 are beveled at their outer edges to form a point with the knife edge thereof. Fixed vertically across each slot 17, of the arms 16, is a flat plate 22 fixed to said arms. Threaded through a central opening of each plate 22 is a set screw 23 provided with a lock nut. The center lines of screws 23 are in a horizontal plane forming a straight line with the knife edges of the blades 21. Lateral play of the scale beam 20 may be adjusted to a proper proportion by turning the set screws 23, and locking the same in place by the lock nuts. Fixed to the ends of arms 16 and over the slots 17 are cover plates 25 to protect the bearings 19 and knife blades 21 from dust and grime.

Scale beam 20 comprises a loading end 26, a scale portion 27, and a balancing end 28. Loading end 26 comprises two parallel, vertical, side walls 29, spaced apart by a pair of vertical walls, not shown, dividing said loading end from the scale portion 27.

Threaded in the upper edge of a vertical wall is a perpendicular threaded rod 88, the center line of which is in the vertical plane of the edges of knife blades 21. Threaded on said rod is a stability ball 89, its function and use being old in the art. Threaded in the face of the vertical wall adjacent to scale portion 27, is a horizontal, threaded rod 93. Threaded on said rod is a sensitivity poise 94 for preadjusting the exact balance of scale beam 20.

Also provided is a tare beam 41, formed with notches 42, and provided with a sliding capacity poise 43. Disposed below beam 41 is another tare beam 44, formed with scale markings 44a, and provided with a sliding fractional capacity poise 45. The sliding poises 43 and 45 are provided with thumb screws 46 to fix said poises on said scales to balance the scale in zero position.

Journalled in suitable bearings is a horizontal, threaded rod 50. Threaded on rod 50 is a traveling poise 53, provided with rearwardly extending, insulated arm 53a. Arm 53a is adapted to engage the limit switch assemblies 48 and 49 to actuate the same when poise 53 nears the ends of its travel on rod 50, for the purpose hereinafter appearing. The zero or initial position of poise 53 is at the left hand side of beam 20 (Fig. 1) with arm 53a actuating switch 48.

Supported on the load knife blades 34 is a loading yoke 70, having bifurcated arms 71 formed with notches 72. Fixed in each notch 72, as by a pin 73, is a cap 74. Fixed to said cap is an inverted bearing 75, resting on said knife blades and supporting said yoke. Fixed to arms 71, across the notches 72, are small plates 77 bearing aligning screws and nuts 78, similar to that used on the fulcrum knife blades 21, and for a similar purpose. Fixed to the center point of yoke 70 is a load yard 76, connected to the loading platform of said scale (not shown), or to some other means upon which a weight may act, either as a positive or negative force (up force or down force).

A motor BM is provided to move the traveling poise 53 on said rod to offset the load applied to the beam 20 whenever a weight acts upon the loading yard 76.

Referring now to the drawings there is fixed to the side of scale cabinet 10 a vertical plate 95. Pivoted to said plate, are two pairs of normally open switch contact arms 98, 99 and 100, 101 for a purpose hereinafter appearing.

Fixed to the end of arm 54 and insulated therefrom by insulation 113, is a contact arm 114, extending beyond the end of said arm and through a notch in plate 95. Fixed to said contact arm are similar upper and lower contact arms 114a and 115b, each separately insulated from contact arm 114 and having layers of insulation 115a and 115b along their respective inward sides.

When the scale is at balance, contact arm 114 is midway between contact arms 99 and 100; contact arm 114a is between contact arms 98 and 99 and contact arm 114b is between contact arms 100 and 101.

Thus, if contact arm 114 were moved upwardly a short distance by a slight unbalance of scale beam 20, said contact and contact 99 would close. If contact arm 114 were moved upwardly a greater distance, contacts 114a and 98 would also close.

Similarly, if contact 114 were moved downwardly a short distance, contacts 114 and 100 would close while contacts 114b and 101 would close thereafter for a greater degree of movement. In all cases, when contacts 114, 114a and 114b are returned to initial position by the balance of scale beam 20, springs 106, 110, 111 and 112 will return their respective contacts to initial condition.

Switch contacts 98, 99, 100, 101, 114, 114a and 114b are connected into the control circuit hereinafter described.

Means is provided to automatically increase or decrease the capacity of scale beam 20 by adding to, or taking away from horizontal bar 60 on said beam unit weights of different values.

To this end, there is fixed, inside cabinet 10, to the top wall thereof, two parallel, depending plates 177 and 178, not shown, spaced apart and made rigid by suitable spacer rods. Fixed to the outer surface of plate 178, in any suitable manner, are normally closed switches UA1 and US1 for a purpose hereinafter appearing.

It will be noted that a set of unit weights 206, not shown, are normally hung on the cross bar 60, and these unit weights balance the beam at zero. With the cams in their respective zero positions, the set of weights 206 are imposed upon the beam, whereas, the set of weights 205 are off the beam, balancing the beam. When any of the unit weights of the set 205 is hung on the cross bar 60, a plus weight is applied to the beam equivalent to the value of the particular unit weight. When one of the unit weights 206 is lifted off the cross bar 60, the capacity of the beam is decreased by an equivalent weight. For this reason, the weights 206 are minus weights, whereas, the weights 205 are plus weights.

The operation adding unit weights to the beam or subtracting minus weights is described in detail in applicant's Patent No. 2,392,023 for Automatic Weighing Scale and need not be described in detail herein.

Referring now to Fig. 2, there is disclosed an electrical circuit C interconnecting the poise limit switches 48 and 49, the unit weight limit switches US1 and UA1, the beam contacts 98, 99, 100, 101, 114, 114a and 114b, the poise motor BM, the unit weight solenoid 285 and the cam switch 394, 395.

Said circuit comprises a "subtract" gas discharge electronic tube 400, which may be of the so-called "thyratron" type and a similar "add" electronic tube 401. The cathode filaments of tubes 402 and 403 are connected to the secondaries of filament transformers 404 and 405, respectively. The primaries of said transformers are connected to a source of A. C. supply voltage ACG, ACH. Tubes 400 and 401 are respectively supplied at their control electrodes or grids 406 and 407 with similar A. C. bias voltages through the use of bias transformers 408 and 409. The primaries of said bias transformers are energized by the source of A. C. voltage; in the present embodiment it having been found practical to connect them respectively to the secondaries of their associated filament transformers.

It should be noted that the terminals of the bias transformers are connected so that their output A. C. voltages (the bias voltages supplied to the grids) are out of phase, respectively with the voltages supplied to the anodes 434 and 430, so that the thyratrons are normally "cut-off," i. e., non-conducting.

The grid bias circuit for the "subtract" thyratron 400 can be traced from the center tap of the secondary of the filament transformer 404 through wire 410 to one terminal of the secondary of bias transformer 408 and from the other terminal of said transformer secondary through the A. C. coupling condenser 411 to thyratron grid 406. The grid bias circuit for the "add" thyratron 401 can be traced from the center tap of the secondary of the filament transformer 405 through wire 412 to one terminal of the secondary of bias transformer 409 and from the other terminal of said transformer secondary through the A. C. coupling condenser 413 to thyratron grid 407.

Means is provided to control said thyratrons to supply a pulsating D. C. voltage to the armature of poise motor BM, the direction of flow of current due to said voltage (and consequently the direction of rotation of said motor), being determined by which one of the thyratrons is controlled.

To this end, there is provided a voltage divider comprising series resistors 414 and 415 connected across the A. C. supply voltage from ACH to ACG. The voltage drop V supplied at the interconnection of said resistors is in phase with the anode voltages and is of a value sufficient to overcome the 180 degree out of phase cut off bias voltage normally supplied to the thyratron grids 400 and 401. Voltage point V is connected by wire 416 to beam contact arm 114.

When the scale beam is in an upward "off balance" position, so that it is necessary to add weight to achieve balance, a circuit is completed from the voltage source V, through wire 416, beam switch 114, 99, wire 417, through speed control rheostat 418 and by wire 419 to thyratron control grid 407. This connection of voltage V to grid 407 will cause the thyratron 401 to ionize, or "fire," and conduct, in substantially half-wave pulses, a pulsating D. C. current flowing in one direction from ACG through normally closed switch 390, 391 associated with solenoid 285, wire 420, current limiting resistors 421 and 422, wire 423, armature 424 of the poise motor BM, wire 425, wire 426, normally closed "add" limit switch contacts 427, 428, wire 429, to anode 430 of thyratron 401, through the ionized thyratron tube to cathode 403 and through the secondary of transformer 405 to ach connected at the center-tap of said secondary. Thus, voltage will be supplied to armature 424 to move the poise in the direction to the right (Fig. 1) to "add" balancing weight to the scale beam. When the scale is not close to balance, so that contact switch 114a, 98 is also closed, as hereinbefore described, a circuit is completed to shunt out current limiting resistor 422, increasing the current to armature 424 and thereby increasing the speed of poise motor BM to move the poise at a fast rate of speed until a position near balance is reached. This circuit can be traced from one terminal of armature 424 through wire 423, wire 431, through closed beam switch contacts 98, 114a, wire 432 to the common junction of resistors 421 and 422.

Resistor 421, in the armature series circuit serves the function of limiting the armature current to a practical value when poise motor is first energized while at rest.

Poise motor BM has a field winding 433 continuously energized by a source of D. C. voltage furnished by a conventional full-wave rectifier R connected to the source of A. C. supply ACH, ACG. It should be noted that since field 433 is continuously energized, thereby eliminating delay occasioned by "Build up" of field excitation voltage, the poise motor response time is minimized. This is important, since at the condition of balance the sensitivity of the scale is such that its beam will oscillate rapidly from "add" to "subtract" position, thereby necessitating fast correctional response of the poise motor in order to maintain a highly accurate position of balance.

Rheostat 418 is included in the thyratron control circuit to adjust the maximum speed of the poise motor. With rheostat 418 adjusted to zero resistance, there will, in effect, be a direct connection from a point V to control grid 407 (the scale being unbalanced, so that switch 99, 114a is closed). In this instance, the resultant A. C. voltage at said grid, due to voltage V and the bias voltage supplied by bias transformer 409, will be substantially in phase with the anode voltage, thereby causing tube 401 to conduct so that anode-cathode current will flow for substantially the whole half cycle, during which the plate is positive with respect to the cathode. However, when rheostat 418 is adjusted so that resistance is added, the series circuit comprising of rheostat 418 and capacity 413 reacts in the well known manner to effect a phase shift in the voltage V at the grid 407. This phase change will, in effect, reduce the length of time of the half-cycle during which anode-cathode current can flow, thereby reducing the average current to and the speed of the poise motor in accordance with the amount of resistance added.

In a similar manner, the maximum speed of the motor can be adjusted for its reverse direction of rotation while controlled by thyratron 400.

When the beam contact switches are in downward "off balance" position so that it is necessary to subtract weight to achieve balance the control voltage V is connected to the "subtract" thyratron control grid 406, through a circuit similar to that outlined for add thyratron 401. However, in the case of the subtract thyratron, the pulsating D. C. current will flow through the poise motor armature 424 in a direction opposite to that when the "add" thyratron is operating. Thus the poise armature excitation current flows from ACH to anode 434, through the ionized thyratron 400 to cathode 402, thence through the secondary center tap of transformer 404, through wire 410, wire 435, through normally closed poise subtract limit switch 436, 437, wire 438, wire 425, armature 424 of the poise motor BM, current limiting resistors 422 and 421, wire 420, through normally closed switch 391, 390 associated with solenoid 285 to ACG.

A resistor shunt circuit similar to that hereinbefore described for the "add" thyratron circuit is provided in connection with the subtract thyratron to increase the speed of the poise motor when the scale is not close to balance, i. e., when the beam switch contacts 100, 114b are closed. This circuit can be traced from one terminal of armature 424, through wire 423, wire 439, through closed beam switch contacts 100, 114b, wire 440, wire 432 to the common junction of resistors 421 and 422.

When, in a weighing operation, the poise cannot find a balance position, but travels to the end of its length of travel and actuates one or the other of the limit switches, it will be evident that the poise motor armature circuit through said actuated limit switch will be opened and the poise motor will stop. At the same time, as is hereinafter described, the unit weight mechanism will be controlled to add or subtract enough unit weights to bring the counter-balancing weight to a value near enough to balance so that the poise 53 can automatically seek the position of final balance.

To this end, there is provided for cooperative action with the poise "subtract" limit switch 436, 437 a pair of normally open switches 441, 442 and 443, 444 each adapted to be closed when said limit switch 48 is actuated and switch 436, 437 is opened. Similarly, there is provided for cooperative action with poise "add" limit switch 427, 428 a pair of normally open switches 445, 446 and 447, 448, each adapted to be closed when said limit switch 49 is actuated and switch 427, 428 is opened.

Contact arm 441 of switch 441, 442 is connected by wire 449 to wire 435. Contact 442 of said switch connects by wire 450 to contact arm 451 of the "subtract" unit weight limit switch US1. Contact 452 of said last switch is connected to one terminal of the energizing winding of a clutch auxiliary relay 453.

Contact arm 445 of switch 445, 446 is connected by wire 454 to wire 429. Contact 446 of said switch connects by wire 455 to contact arm 456 of the "add" unit weight limit switch UA1. Contact 457 of said last switch is connected to the same terminal of the energizing winding of clutch auxiliary relay 453. The remaining terminal of said winding is connected to the source of A. C. supply ACG.

It is now evident that if either of the limit switches are actuated, relay 453 will be energized; thus, in the case where the poise "add" limit switch is actuated, an energizing circuit will be completed to the clutch auxiliary relay 453 from ACH to the center-tap and through the transformer 405, through thyratron 401 from cathode 403 to anode 430, wire 429, wire 454, through now closed limit switch 445, 446, wire 455, through closed unit weight "add" limit switch 456, 457 to one terminal of said clutch auxiliary relay, through its energizing winding to ACG. In the case where the poise "subtract" limit switch is actuated, an energizing circuit will be completed to the clutch auxiliary relay 453 from ACH through thyratron 400, through transformer 404 to its secondary center-tap, wire 410, wire 435, wire 449, through now closed limit switch 441, 442, wire 450, through closed unit weight "subtract" limit switch 451, 452 to one terminal of said clutch auxiliary relay through its energizing winding to ACG.

Clutch auxiliary relay 453 has associated with it a pair of switch arms 458, 459, normally open, but adapted to be closed when said relay is energized. Switch arm 458 is connected to the source of A. C. supply ACH and switch arm 459 connects through wire 460 to one terminal of the energizing winding of clutch relay 285. The remaining terminal of said winding is connected to ACG. Thus, the energizing clutch auxiliary relay 453 will close the circuit to clutch relay 285 energizing it and effecting the operation of its associated switches 290, 291, 292, 293 and 390, 391.

In order that the unit weight mechanism may operate to either add or subtract unit weights to reach balance, unit weight reversing means is employed. To this end, there is provided a pair of reversing relays, 461 and 462, each having associated with it a pair of normally open switch arms 461a, 461b, 461c, 461d and 462a, 462b, 462c, 462d, respectively, adapted to be closed-circuited when their relay is energized.

One energizing terminal of relay 461 is connected by wire 463 to switch contact arm 444. One terminal of relay 462 is connected by wire 464 to switch contact arm 448. Switch contact arms 443 and 447 both connect to ACH. The remaining terminals of relays 461 and 462 are interconnected by wire 465 and are connected in common by wire 466 to contact arm 293 of switch 292, 293 associated with the clutch control solenoid 285. Switch contact arm 292 is connected to ACG.

Switch arms 461a and 462d are connected to ACH. Switch arms 461b and 462b are interconnected by wire 467 and connected in common by wire 468 to one terminal of field winding 469 associated with unit weight motor UWM. Switch arms 461c and 462c are interconnected by wire 470 and connect in common by wire 471 to the remaining terminal of said field winding.

Switch contact arms 461d is connected by wire 472 to switch arm 462a, said switch arms being connected in common by wire 473 to one terminal of armature 474 associated with unit weight motor UWM. The other terminal of said armature is connected by wire 475 to contact arm 394 of cam switch 394, 395. Said contact arm is also connected by wire 476 to contact arm 290 of switch 290, 291, associated with unit weight clutch relay 285. Switch contact arm 291 and cam switch arm 395 are connected to ACG. Said other terminal of armature 474 is also connected by wire 477 to one terminal of low speed cut-in resistance 478, the other terminal of said resistance being connected to ACG.

It will now be evident that when poise "subtract" limit switch 48 is actuated, an energizing circuit is completed to relay 461, and when "add" limit switch 49 is actuated, an energizing circuit is completed to relay 462. These circuits can be traced from ACH, through closed limit switch 443, 444, wire 463 to relay 461, thence through wires 465 and 466 and closed switch 292, 293 (as is hereinbefore described), to ACG, for relay 461; and from ACH through closed limit switch 447, 448, wire 464 to relay 462, thence through wire 466 and the closed switch 292, 293 to ACG, for relay 462.

When relay 461 is energized, current is allowed to flow in one direction through the field 469 of series connected unit weight motor UWM. This current can be seen to flow from ACH, through closed switch 461a, 461b, wire 467 and 468, up through field coil 469, wires 471, 470, through closed switch 461c, 461d, wire 472, 473, armature 474 of the unit weight motor, thence through wire 477 and resistance 478 to ACG, through wire 475 and switch 394, 395 to ACG, or through wires 475 and 476 and switch 290, 291 to ACG.

When relay 462 is energized, current will flow in the opposite direction through field coil 469, and thus the armature of the unit weight mechanism motor UWM will rotate in the opposite direction. This path of current flow can be traced from ACH, through closed switch 462c, 462d, wire 470 and 471, down through field coil 469, wires 468, 467, through closed switch 462a, 462b, wire 73, armature 474 and thence to ACG as before.

The overall operation of the circuit in controlling the unit weight mechanism of the weighing scale is outlined below.

Assume that some positive weight or load greater than the traveling poise 53 can balance out is placed on the scale. (In the present embodiment, this is a load greater than 250 pounds.) This weight will cause the poise to move steadily out along the beam until it actuates the limit switches 49. This actuation opens the circuit through switch 427, 428 to the poise motor BM, thereby stopping it and further movement of the poise. At the same time, an energizing circuit is completed through poise limit switch 447, 448 to one terminal of relay 462, which will allow energizing current to flow through the field 469 of unit weight motor UWM in a direction to turn said motor in the direction to add unit weights. Also, at the same time, the energizing circuit from "add" thyratron control tube 401 is closed through the clutch auxiliary relay 453, closing its switch 458, 459 and thereby completing an energizing circuit to the unit weight clutch relay 285.

The unit weight clutch relay operates its associated switches adapted to operate as follows: The poise motor energizing switch 390, 391 will operate first, opening as soon as clutch relay 285 is energized and closing again only when follower 328 is thereafter seated in notch 326 at the end of the sequence of unit weight addition. Switch 292, 293 will close as soon as follower 328 is out of notch 326, thereby completing a circuit, from ACG through said switch, wire 466 through relay 462, switch 447, 448 to ACH. The energization of said relay, as hereinbefore explained, connects in the field winding of motor UWM to turn it in the proper direction. Switch 290, 291, shunting speed reducing series resistor 478, is closed only when the clutch relay 285 is energized.

It will now be evident that when poise limit switch 49 is actuated, the energizing circuit to the poise motor will be open circuited, the unit weight motor will be energized to add unit weights (in increments less than the maximum counter-balancing capacity of the traveling poise 53), resistance 478 will be shorted out so that the unit weight motor will operate at maximum speed to add unit weights, and clutch mechanism will engage to connect motor UWM with the unit weight mechanism.

When enough weights have been added, the balance arm on the scale will tip downwardly. Thus, as hereinbefore described, the add energizing circuit from the thyratron 401 will now be deenergized and the poise motor BM will be energized through poise subtract limit switch 48 to move the poise 53 in the opposite direction and off limit switch 49, opening the circuit to clutch auxiliary relay 453 and unit weight clutch relay 285. Upon the deenergization of clutch relay 285, the switch 290, 291 will first open, allowing the cam switch 394, 395 to control the shunting circuit for the unit weight motor series speed reducing resistance 478. Subsequently, switch 394, 395 opens, opening the shunting circuit across series resistance 478 and thereby slowing down the speed of the unit weight motor just before it is to be stopped. Sequentially, switch 292, 293 will open first, deenergizing the unit weight motor UWM and allowing it to be stopped. When a follower is fully seated in suitable notch, the whole unit weight mechanism will become locked at its rest position, the clutch mechanism will disengage and switch 390, 391 will close, completing a circuit to start the poise motor BM to move the poise 53 in the "subtract" direction. The poise 53 will then move until the balance position is found as hereinbefore described.

The operation of the control circuit in weighing negative loads is similar to that detailed above, except that the corresponding "subtract" unit weight circuit through switches 48 is energized, so as to drive unit weight motor UWM in a direction to remove unit weights from, rather than add them to, horizontal arm 60.

It will thus be seen that there is provided a device in which the several objects of this invention are achieved, and which is well adapted to meet the condition of practical use.

As various possible embodiments might be made of the above inventions, and as various changes might be made in the embodiment set forth, it is to be understood that all matter herein described or shown in the accompanying drawings is to be interpreted as illustrative and not in a limiting sense.

Having thus described our invention, we claim as new and desire to secure by Letters Patent:

1. In combination, a weighing scale having a balance beam and a poise movable along said balance beam, a normally deenergized reversible motor, means controlled by the motor operable to move said poise in opposite directions along said beam, a pair of thyratrons, each being disposed in opposite phase relation to one another and connected in parallel with one terminal of said motor, means connecting the other terminal of said motor to a source of alternating current, means normally biasing said thyratron only, and means controlled by the underbalance means open when the beam is in balance, means controlled by overbalance of the beam to connect said second biasing means through said switch means to one thyratron only, and means controlled by the underbalance of said beam to connect said second biasing means through said switch means to the other thyratron only.

2. In combination, a weighing scale having a balance beam and a poise movable along said balance beam, a normally deenergized reversible motor means controlled by the motor operable to move said poise in opposite directions along said beam, a pair of thyratrons, each being disposed in opposite phase relation to one another and connected in parallel with one terminal of said motor, means connecting the other terminal of said motor to a source of alternating current, means normally biasing said thyratrons at cut-off, a second biasing means, switch means open when the beam is in balance, means controlled by overbalance of the beam to connect said second biasing means through said switch means to one thyratron only, and means controlled by the underbalance of said beam to connect said second biasing means through said switch means to the other thyratron only, and means to vary the current flow of each thyratron dependent upon the degree of overbalance or underbalance of the beam.

3. In combination, a weighing scale having a balance beam and a poise movable along said balance beam, a normally deenergized reversible motor means controlled by the motor operable to move said poise in opposite directions along said beam, a pair of thyratrons, each being disposed in opposite phase relation to one another and connected in parallel with one terminal of said motor, means connecting the other terminal of said motor to a source of alternating current, means normally biasing said thyratrons at cut-off, a second biasing means for each of the respective thyratrons, switch means open when the beam is in balance comprising plural contacts, one of said plurality of contacts being connected to the grid of a respective thyratron and a second contact of said plurality of contacts being connected to the grid of the other thyratron, means controlled by the overbalance of the beam to connect said second biasing means to one of said plurality of contacts, and means controlled by the underbalance of said beam to connect said second biasing means to said second contact of said plurality of contacts.

4. In combination, a weighing scale having a balance beam and a poise movable along said balance beam, a normally deenergized reversible motor means controlled by the motor operable to move said poise in opposite directions along said beam, a pair of thyratrons, each being disposed in opposite phase relation to one another and connected in parallel with one terminal of said motor, means connecting the other terminal of said motor to a source of alternating current, a resistor in series therewith, means normally biasing said thyratrons at cut-off, a second grid biasing means, switch means open when the beam is in balance comprising plural yieldable contacts, a plurality of swinging contacts mounted on and guided by said beam, one of said swinging contacts being connected to said second grid biasing means, said swinging contact adapted to connect with one of said yieldable contacts upon overbalancing of the beam and another of said yieldable contacts being adapted to connect with said swinging contact upon an underbalance of the beam, and a third of said yieldable contacts being adapted to be engaged by a differing swinging contact upon a relatively greater overbalancing of the beam, and a fourth yieldable contact adapted to be connected to a third swinging contact upon a relatively greater underbalancing of the beam, said third and fourth contacts being connected to said one terminal of said motor and said second and third swinging contacts being connected to said source of alternating current, whereby a relatively greater overbalance or underbalance will connect said yieldable contacts and said swinging contacts to shunt out said resistance and simultaneously bias the respective thyratron to supply current to said motor.

References Cited in the file of this patent

UNITED STATES PATENTS

| | | |
|---|---|---|
| 1,924,459 | Ryder | Aug. 29, 1933 |
| 2,288,295 | Moyer et al. | June 30, 1942 |
| 2,297,719 | Satterlee | Oct. 6, 1938 |
| 2,392,023 | Cooper | Jan. 1, 1946 |